United States Patent [19]

Kim

[11] Patent Number: 5,601,062
[45] Date of Patent: Feb. 11, 1997

[54] INTAKE SYSTEM FOR ENGINE

[75] Inventor: Yoonsuk Kim, Kyungki-do, Rep. of Korea

[73] Assignee: Hyundai Motor Company, Rep. of Korea

[21] Appl. No.: 522,488

[22] Filed: Aug. 31, 1995

[30]  Foreign Application Priority Data

Sep. 1, 1994 [KR] Rep. of Korea ............. 94-22511

[51] Int. Cl.$^6$ ............................................. F02M 29/04
[52] U.S. Cl. ............................................. 123/306
[58] Field of Search ................. 123/306, 184.21, 123/184.24, 184.42, 184.34, 184.48, 590

[56]  References Cited

U.S. PATENT DOCUMENTS

| | | | |
|---|---|---|---|
| 4,574,751 | 3/1986 | Sugiyama et al. | 123/184.21 |
| 4,580,544 | 4/1986 | Walker | 123/306 |
| 4,745,890 | 5/1988 | Wyczalek et al. | 123/306 |
| 5,322,043 | 6/1994 | Shriner et al. | 123/306 |
| 5,474,044 | 12/1995 | Matterazzo et al. | 123/306 |

*Primary Examiner*—Marguerite McMahon
*Attorney, Agent, or Firm*—Finnegan, Henderson, Farabow, Garrett, & Dunner, L.L.P.

[57]  ABSTRACT

The present invention discloses an intake system for engine comprising plural swirl generating members wherein an intake chamber for temporarily storing an air sucked by a negative pressure of an engine, comprising an intake guide plates against which the air induced into the intake chamber strikes and plural cylindrical tubes formed as integral type with the intake guide plates making the air striking against the intake guide plates be swirl flow having a certain direction. The plural cylindrical tubes of the intake system have centers corresponding to centers of an intake manifolds for inducing the air in the intake chamber into a combustion chamber, each swirl generating member thereof is connected respectively with an adjacent open portion by the intake induce plates, and said intake guide plates thereof are extended to the direction of tangents of said plural cylindrical tubes.

14 Claims, 2 Drawing Sheets

INTAKE SYSTEM FOR ENGINE

BACKGROUND OF THE INVENTION

(1) Field of the Invention

The present invention relates to an intake system for an internal combustion engine. More particularly, it relates to an intake system for an engine, which can improve combustion efficiency and reduce emission by providing air with high swirl flow into each combustion chamber.

(2) Description of the Prior Art

A particular type of engine has a fuel injection system for inducing only air by negative pressure of an engine and a fuel injector for injecting fuel to a flow of the induced air.

This engine is designed such that the air is induced into an intake chamber called a surge tank and then flows into a combustion chamber.

The intake chamber is connected with a throttle body and supplied with the air required for combustion. The intake chamber provides the air to the plural combustion chambers via an intake manifold.

The intake manifold is connected with an intake port of a cylinder block to supply the air into the combustion chamber. The fuel injector is mounted on the intake port to inject the fuel to the flow of the air flowing to the combustion chamber.

However, since the fuel injector injects the fuel in only one place, that is, an outskirt of an inner circumference of the intake port, the air and fuel are not uniformly mixed.

Further, since air flow induced into the intake port through the intake manifold is generally laminar, the air and the fuel are not uniformly mixed when the fuel is injected to such a flow, and it causes a deterioration of the engine efficiency because of the limit for supplying with the sufficient air.

The mixed gas induced into the combustion chamber generates the power of the engine with ignition by a spark plug and combustion. Thus, if the gas in which the air and the fuel are ununiformly mixed is induced into the combustion chamber, it causes incomplete combustion and a prolongation of ignition time.

Since the incomplete combustion causes a lot of harmful materials (HC, NOx) in exhaust gas and a deterioration of the engine output, it does not improve the fuel consumption ratio.

An intake dispenser having a swirl guide in an intake chamber is disclosed in Japanese Utility Model Publication No. 91-65822 to solve such a problem.

However, the high swirl can not be made though the intake guide provided in the intake dispenser, because this device provides intake gas swirl flow by dividing the intake gas in two directions.

In addition, the method disclosed in Japanese Utility Model Publication No. 85-30322 has a demerit that resistance is applied to the flow of the intake gas though a blade mounted on the lower part of the valve guide guiding the intake valve makes the intake gas be swirl flow.

SUMMARY OF THE INVENTION

It is an object of the present invention to provide an intake system for an engine for making a combustion condition good to improve engine output, minimizing the amount of harmful materials in exhaust gas, and lowering fuel consumption ratio by making air induced into a surge tank be high swirl flow to induce uniformly mixed gas into a combustion chamber.

To achieve the above object, the present invention proposes an intake system for engine comprising:

intake chamber for temporarily storing an air sucked by a negative pressure of an engine;

plural intake manifolds for inducing the air from the intake chamber into a combustion chamber; and plural swirl generating means placed in the intake chamber for supplying the air into the combustion chamber by changing an air flow induced into the intake chamber into a swirl flow.

Further, the swirl generating members comprise intake guide plates against which the air induced into the intake chamber strikes and plural partially cylindrical tubes formed integrally with the intake guide plates for making the air striking against the intake guide plates swirl flow in a certain direction.

Further, each cylindrical tube has an open portion through which the air can be induced and centers of the plural partially cylindrical tubes correspond with to centers of the intake manifolds.

Further, the plural partially cylindrical tubes have a closed end by contacting one of the inner surfaces of the case defining the intake chamber.

Further, the intake guide plates extend in a tangent direction of each cylindrical tube.

BRIEF DESCRIPTION OF THE DRAWINGS

The above object and other advantages of the present invention will become more apparent by describing in detail the preferred embodiment of the present invention with reference to the attached drawings in which.

DETAILED DESCRIPTION OF THE PREFERRED EMBODIMENTS

Figure 1:
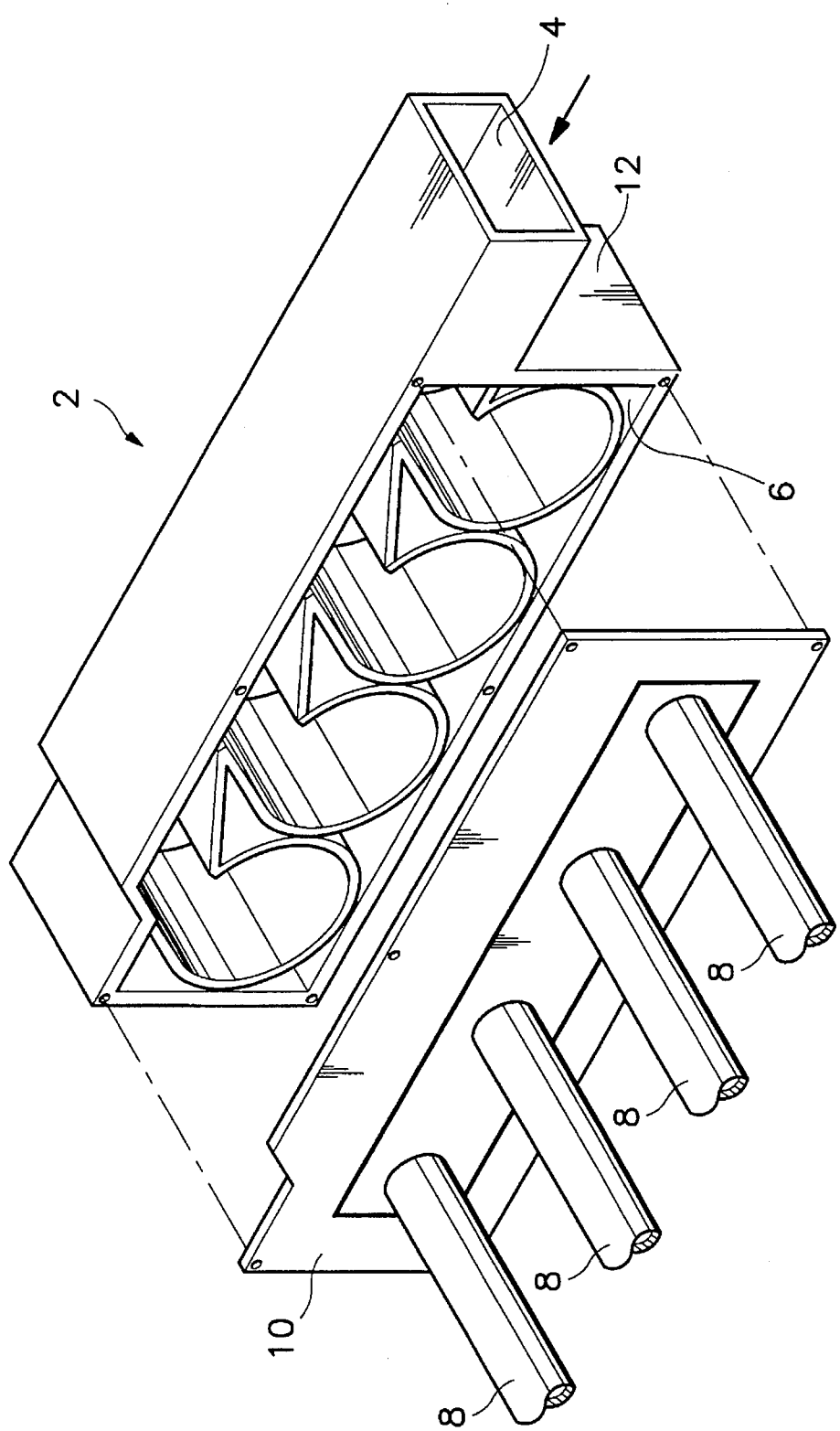
FIG. 1 is a perspective view showing an inside of an intake chamber by opening a cover of the intake chamber of the present invention.

Referring to FIG. 1, an intake chamber 2 has a normal structure comprising an inlet 4 connected with a throttle body (not shown), through which air is induced therein, and an outlet 6 providing the air induced from the inlet 4 into a combustion chamber (not shown).

A cover 10 to which plural intake manifolds 8 are connected is removably coupled to the outlet 6 of the intake chamber 2.

Bolts or rivets are used for coupling the cover 10 and a gasket (not shown) is provided between the case 12 and the cover 10 as a sealing member.

Figure 2:
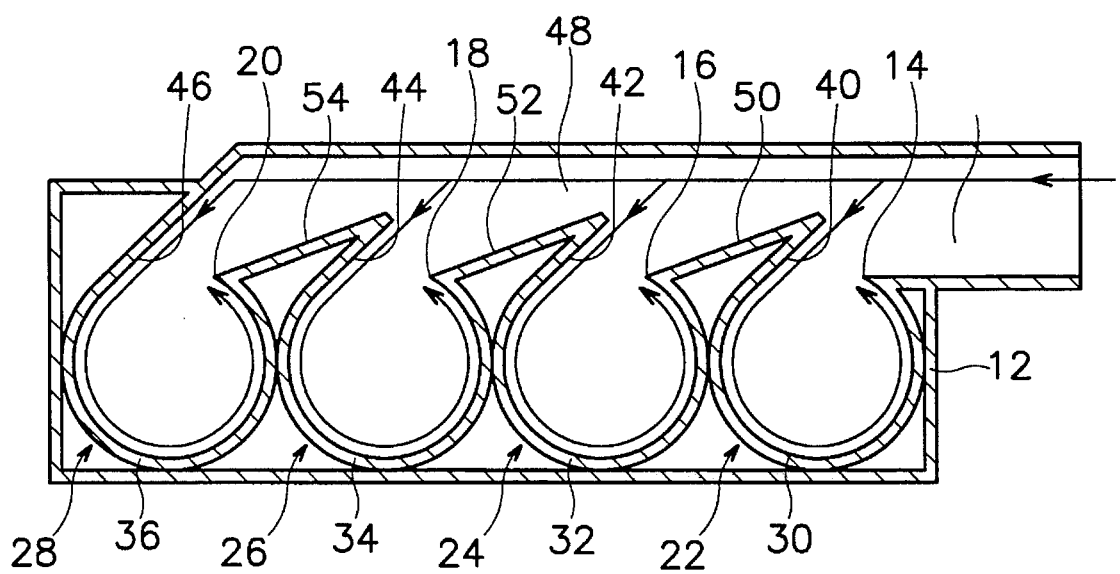
FIG. 2 is a side sectional view showing the intake system in FIG. 1 assembled.

As shown in FIGS. 1 and 2, plural swirl generating members 22, 24, 26 and 28 having respective open portions 14, 16, 18 and 20 facing toward the inlet 4 are mounted inside of the intake chamber 2.

The swirl generating members 22, 24, 26 and 28 are formed with relatively thin metal plates rolled into the form of a partial cylinder and integrally formed with the case 12.

The swirl generating members 22, 24, 26 and 28 comprise partially cylindrical tubes 30, 32, 34 and 36 and intake guide plates (40, 42, 44 and 46) extending in a tangent direction of the partially cylindrical tubes 30, 32, 34 and 36.

The open portions 14, 16, 18 and 20 are respectively formed on the partially cylindrical tubes 30, 32, 34 and 36 such that each tube has such a portion along the circumference that is open to form a partially cylindrical shape.

One end of the each of partially cylindrical tubes 30, 32, 34 and 36 is obstructed by contacting one inner side of the case 12 and each other end of the tubes 30, 32, 34 and 36 is obstructed by another inner side of the cover 10.

Centers of the partially cylindrical tubes 30, 32, 34 and 36 are respectively positioned to correspond to centers of the intake manifolds 8 so that they communicate with each other.

The intake guide plates 40, 42, 44 and 46 are respectively directed toward the inlet 4 and extend from the partially cylindrical tubes 30, 32, 34 and 36 to half of the height of the inlet 4 to induce a part of the air flowing from the inlet 4.

The inlet 4 of the case 12 is placed higher than each intake guide plate to form an intake passage 48 such that the air can uniformly flow into all the swirl generating members 22, 24, 26 and 28.

The intake guide plates 40, 42 and 44 of the swirl generating members 22, 24, 26 and 28 are connected respectively with the adjacent open portions 34, 36 and 38 by the intake induce plates 50, 52 and 54 to induce the air flowing through the intake passage 48 into the partially cylindrical tubes 30, 34, 34 and 36.

The intake induce plates 50, 52 and 54 have a width such that oppose one sides thereof contact the inside of the case 12 and the inside of the cover 10.

The swirl generating members 22, 24, 26 and 28 can be integrally formed with the case 12 or adhered on the corresponding place in the case 12 after being separately manufactured.

In the intake system as described above, the air is induced through the inlet 4 by the negative pressure of the engine and then directed to the intake passage 48 formed in the case 12. At this point, a part of the air flowing through the intake passage 48 strikes against the intake guide plates 40, 42, 44 and 46 and flows along the partially cylindrical tubes 30, 32, 34 and 36 of the swirl generating members 22, 24, 26 and 28.

Since each of the partially cylindrical tubes 30, 32, 34 and 36 is cylindrically bent except at the open portions 14, 16, 18 and 20, the air flowing along the partially cylindrical tubes 30, 32, 34, and 36 is changed from a laminar flow into a swirl flow.

The air induced into the case 10 when the swirl flow is started swirls in a predetermined direction.

Figure 3:
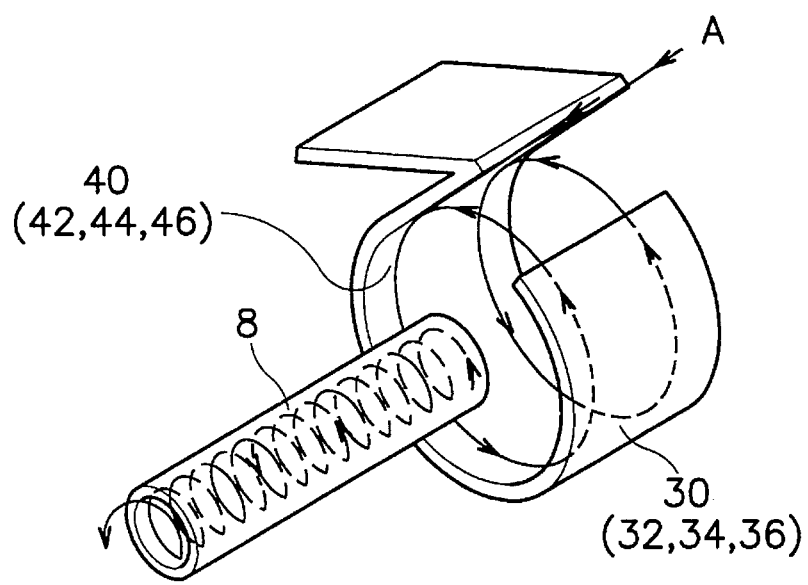
FIG. 3 shows a process for making an intake gas swirl flow.

As shown in FIG. 3, the air induced into the partially cylindrical tubes 30, 32, 34, and 36 along the direction A (shown by an arrow in FIG. 3) is changed into swirl flow having a certain direction. At this moment, since the negative pressure of the engine works on the intake manifolds 8, the air is sucked out through the intake manifolds 8 with the direction of swirl flow and induced into the combustion chamber.

When the fuel is injected into the swirl flow air having a certain direction by the fuel injector mounted on the intake port, the fuel is rapidly and uniformly mixed with the air to thereby be atomized.

Since this well mixed gas is directly induced into the combustion chamber, the combustion efficiency can be improved to decrease the amount of the harmful materials in the exhaust gas as well as improve the fuel consumption ratio by increasing the engine output.

Further, even if the solenoid valve coil is deteriorated, the errors caused by the variation of the resistance value can be compensated, and therefore, the steering wheel can be controlled with an exact steering force.

Although only a preferred embodiment and select modifications of the invention have been disclosed and described, it is apparent that other embodiments and modifications of the invention are possible within the scope of the appended claims.

What is claimed is:

1. A swirl generating system for an intake system of an engine having an intake chamber for temporarily storing air drawn into the engine, comprising:

intake guide plates against which air drawn into the intake chamber strikes; and a plurality of partially cylindrical tubes integrally formed with the intake guide plates so that air striking the intake guide plates flows with a swirling motion in a predetermined direction.

2. The swirl generating system according to claim 1, further comprising intake manifolds for directing air to a combustion chamber of the engine, wherein the partially cylindrical tubes fluidly communicate with the intake manifolds to direct air from the intake chamber to the combustion chamber.

3. The swirl generating system according to claim 1, further comprising intake inducing plates connecting adjacent open portions of the partially cylindrical tubes.

4. The swirl generating system according to claim 1, wherein the intake guides plates extend tangentially from the partially cylindrical tubes.

5. An intake system for an engine, comprising:

an intake chamber for temporarily storing air drawn into the engine;

intake manifolds for directing the air from the intake chamber to a combustion chamber; and a plurality of swirl generating members in the intake chamber for changing a flow of air into the intake chamber to a swirl flow and supplying the air with a swirl flow to the intake manifolds.

6. The intake system according to claim 5, wherein each of the swirl generating members comprises an intake guide plate against which air drawn into the intake chamber strikes, and a partially cylindrical tube formed integrally with the intake guide plate so that air striking the intake guide plate flows with a swirl in a predetermined direction.

7. The intake system according to claim 6, wherein the partially cylindrical tube has an open portion through which air flows and wherein a center of the partially cylindrical tube is aligned with a center of one of the intake manifolds.

8. The intake system according to claim 6, wherein the partially cylindrical tube contacts an inner surface of a case defining the intake chamber to close one end of the partially cylindrical tube.

9. The intake system according to claim 6, wherein the intake guide plate extends tangentially from the partially cylindrical tube.

10. An intake system for an engine, comprising:

a case forming an intake chamber for temporarily storing air drawn into a combustion chamber;

a cover removably coupled to one side of the case;

a plurality of intake manifolds mounted on the cover to fluidly couple the intake chamber to the combustion chamber; and a plurality of swirl generating members mounted in the case, the swirl generating members being aligned with the intake manifolds and changing a flow of air into the intake chamber to a swirl flow for supplying the air with a swirl flow to the intake manifolds.

11. The intake system according to claim 10, wherein an intake passage, through which air uniformly flows, extends from an inlet portion of the case to open portions in the swirl generating members.

12. The intake system according to claim 10, wherein each of the swirl generating members comprises a partially cylindrical tube having an open portion through which the air is drawn and an intake guide plate extending tangentially from the partially cylindrical tube.

13. The intake system according to claim 12, wherein said intake guide plate extends toward an inlet portion of the case and is inclined so that air passing through the inlet portion strikes the plate and enters the open portion.

14. The intake system according to claim 12, further comprising a plurality of intake induce plates connecting adjacent open portions in the swirl generating members.

* * * * *